Sept. 8, 1925.
M. KURTH
1,552,847
OIL FIRE TUBE
Filed Sept. 4, 1924
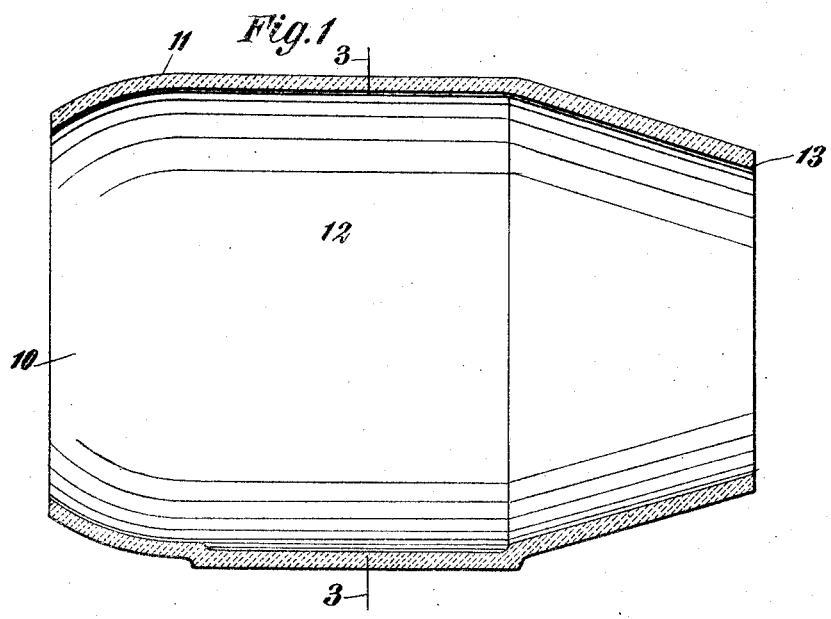
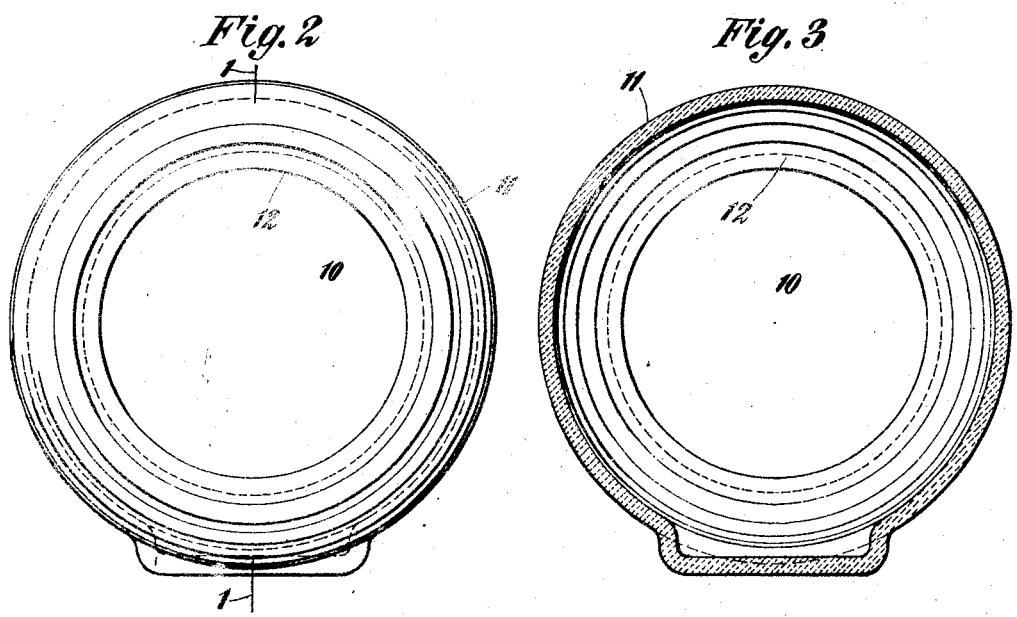
INVENTOR
Max Kurth.
BY
ATTORNEY Patented Sept. 8, 1925.

1,552,847

UNITED STATES PATENT OFFICE.

MAX KURTH, OF NEW YORK, N. Y.

OIL-FIRE TUBE.

Application filed September 4, 1924. Serial No. 735,770.

*To all whom it may concern:*

Be it known that I, MAX KURTH, a citizen of Germany, residing at New York, in the county of Bronx and State of New York, have invented certain new and useful Improvements in Oil-Fire Tubes, of which the following is a specification.

This invention relates to improvements in fire tubes, particularly such used with oil firing and which are intended to replace the customary fire-bricks used as fire-box lining.

It is the principal object of the invention to provide a silica oil fire tube made in one piece and one which is absolutely impervious and fire-proof.

Another object of the invention is the provision of an oil-fire tube which is not pressed and burnt as the customary firebrick, which however is made from molten quartz or fused silica and is absolutely solid, and has a smooth inner face positively impervious to oil and furthermore is not likely to crumple or lose any of the strength of its walls during use.

A further object of the invention is the provision of a silica oil fire tube which will not allow the escape of oil even under the highest pressure and in this manner will positively prevent explosion.

The silica fire tube according to the present invention has a reduced rear end in which the flame, which spreads in the tube body is collected again, so that every drop of oil must be consumed within the tube thus producing an increase of heat, and preventing its escape through the chimney.

The tube according to the present invention is so constructed that it can quickly and readily be exchanged by any workman within a short time, no skilled mechanic, such as a bricklayer, etc., needs to be consulted, and therefore no interruption in the operation is to be feared.

These and other objects of my invention will become more fully known as the description thereof proceeds and will then be specifically pointed out in the appended claim.

In the accompanying drawing, forming a material part of this disclosure:—

Figure 1 is a longitudinal section through a fire-tube constructed according to this invention, the section being taken on line 1—1 of Figure 2.

Figure 2 is an end view of the tube.

Figure 3 is a cross section through the tube on line 3—3 of Figure 1.

The tube constructed according to the present invention comprises a body 10 having an outer mantle 11 made from molten quartz or fused silica, the inner face 12 of which is absolutely smooth, thus providing an impervious face which cannot be penetrated by oil even when entered under a very high pressure, and which is absolutely fire-proof and not liable to crumble.

The rear end of the tube is reduced as indicated at 13 in order to bunch the flame again which has spread in the body proper in order to increase the heat and cause a perfect combustion avoiding all loss through escape through the chimney. A worn tube can be easily and quickly exchanged without the necessity of employing skilled labor and without interruption of the operation of the plant.

It will be clear that the tube may be made in wall strengths of varying thickness and in varying sizes and in any convenient shape or form without departure from the scope and spirit of the invention as disclosed in the appended claim.

Having thus described my invention, what I claim as new and desire to secure by Letters Patent, is:—

A fire tube comprising a quartz body having a smooth inner face impervious to oil and fire-proof, a reduced conical rear end on said body for collecting the heat spread in the body, the opposite end being curved inwardly, and a flat surfaced projection centrally on said body.

In witness whereof I have affixed my signature.

MAX KURTH.